(12) United States Patent
Miyazaki

(10) Patent No.: US 8,300,273 B2
(45) Date of Patent: Oct. 30, 2012

(54) IMAGE GENERATING DEVICES AND PRINTING DEVICES THAT GENERATE ELLIPTICAL RADIAL GRADATIONS AND IMAGE GENERATING METHODS FOR GENERATING ELLIPTICAL RADIAL GRADATIONS

(75) Inventor: Sadaaki Miyazaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 585 days.

(21) Appl. No.: 12/412,345

(22) Filed: Mar. 26, 2009

(65) Prior Publication Data
US 2009/0244576 A1    Oct. 1, 2009

(30) Foreign Application Priority Data
Mar. 31, 2008  (JP) ................................ 2008-093147

(51) Int. Cl.
*H04N 1/40*   (2006.01)
(52) U.S. Cl. ........ 358/3.01; 358/1.9; 358/1.18; 358/2.1; 345/441; 345/442; 345/627; 345/628
(58) Field of Classification Search ........................ None
See application file for complete search history.

(56) References Cited

U.S. PATENT DOCUMENTS

| | | | | |
|---|---|---|---|---|
| 5,852,679 | A * | 12/1998 | Shimizu | ........................ 382/180 |
| 6,201,550 | B1 | 3/2001 | Sakamoto | |
| 6,515,763 | B1 * | 2/2003 | Dermer et al. | .................. 358/1.9 |
| 6,870,954 | B1 * | 3/2005 | Gupta | ........................... 382/162 |
| 2002/0126302 | A1 | 9/2002 | Fukao | |
| 2004/0246510 | A1 | 12/2004 | Jacobsen et al. | |
| 2006/0244748 | A1 * | 11/2006 | Long et al. | ..................... 345/422 |
| 2006/0274057 | A1 | 12/2006 | Van Ness et al. | |
| 2009/0244630 | A1 * | 10/2009 | Miyazaki | ..................... 358/3.01 |

FOREIGN PATENT DOCUMENTS

| | | |
|---|---|---|
| JP | H11-031231 A | 2/1999 |
| JP | H11-102446 A | 4/1999 |

OTHER PUBLICATIONS

The State Intellectual Property Office of the People's Republic of China, Notification of First Office Action for Chinese Patent Application No. 200910133032.8 (counterpart to above-captioned patent application), issued Feb. 23, 2011.

(Continued)

*Primary Examiner* — Twyler Haskins
*Assistant Examiner* — Christopher D Wait
(74) *Attorney, Agent, or Firm* — Baker Botts L.L.P.

(57) ABSTRACT

An image generating device comprises an acquisition unit which acquires an image drawing instruction for drawing an elliptical radial gradation from accepted target data, an extraction unit which extracts elliptical shape parameters and gradation pattern parameters from the acquired image drawing instruction, a transformation matrix generating unit which generates a transformation matrix for transforming an elliptical shape specified by the elliptical shape parameters into a perfect circular shape based on the elliptical shape parameters, an inverse matrix calculating unit which calculates an inverse matrix of the transformation matrix, a transformation unit which transforms the gradation pattern parameters using the transformation matrix, a drawing unit which draws a gradation for the perfect circular shape based on the transformed gradation pattern parameters, and a gradation generating unit which generates the elliptical radial gradation by inversely transforming the perfect circular shape (including the gradation drawn by the drawing unit) using the inverse matrix.

9 Claims, 6 Drawing Sheets

OTHER PUBLICATIONS

"RadialGradientBrush Members," Nov. 30, 2007, pp. 1-4, available at http://msdn.microsoft.com/zh-cn/library/ms635492(v=VS.90).aspx (searched on Mar. 22, 2011). (Concise explanation of relevance provided in attached Notification of First Office Action.).

European Patent Office, European Search Report for European Patent Application No. 09250922.3 (counterpart to above-captioned patent application), dated Mar. 25, 2011.

The State Intellectual Property Office of the People's Republic of China, Notification of the Second Office Action for Chinese Patent Application No. 200910133032.8 (counterpart to above-captioned patent application), issued Apr. 23, 2012.

* cited by examiner

FIG.2A

```
<RadialGradientBrush>
        MappingMode="Absolute"
31 ──    CENTER="150, 150"
32 ──    Gradientorigin="200, 170"
33 ──    RadiusX="140"
34 ──    RadiusY="100">
        <RadialGradientBrush. GradientStops>
              <GradientStop Color="#FFFF00" Offset="0" />  ── 35a
35 {          <GradientStop Color="#0000FF" Offset="1" />  ── 35b
        </RadialGradientBrush. GradientStops>
</RadialGradientBrush>
```

Center="Cx, Cy" : CENTER COORDINATES OF ELLIPTICAL SHAPE=(Cx, Cy)
CredientOrigin="Gx, Gy" : CENTER COORDINATES OF GRADATION="Gx, Gy"
RadiusX="Rx" : X-RADIUS=(RADIUS IN X-AXIS DIRECTION)Rx
RadiusY="RY" : Y-RADIUS=(RADIUS IN Y-AXIS DIRECTION)Ry
GradientStop Color="#RsGsBs" Offset="0" : COLOR VALUES AT CENTER OF GRADATION Rs, Gs, Bs
GradientStop Color="#ReGeBe" Offset="1" : COLOR VALUES AT PERIPHERY OF ELLIPSE Re, Ge, Be

FIG.2B

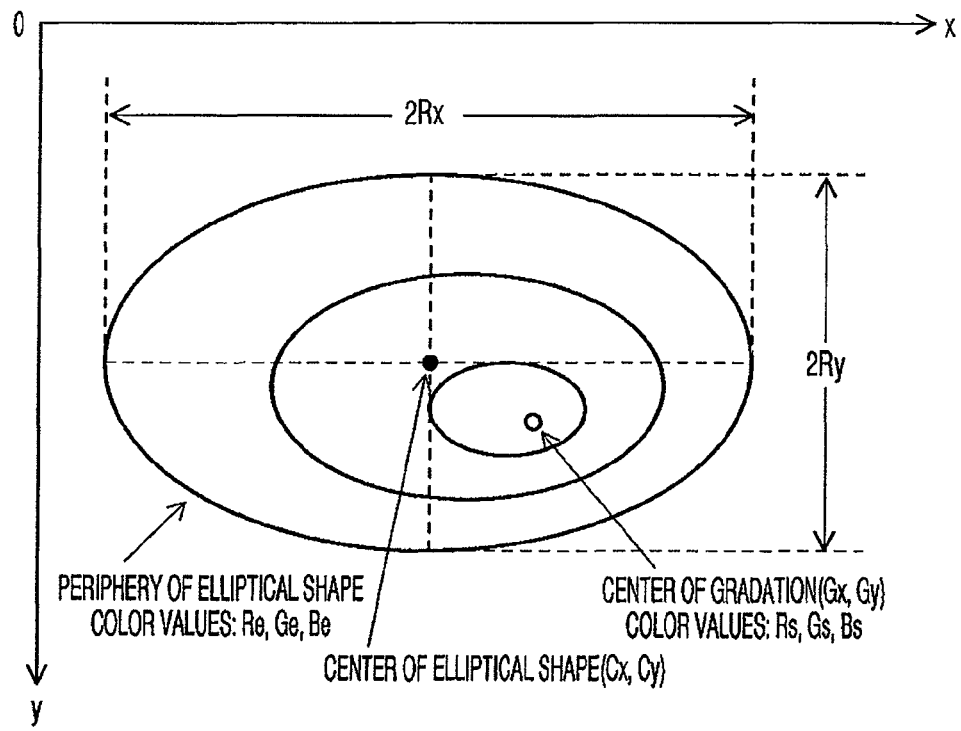

PERIPHERY OF ELLIPTICAL SHAPE
COLOR VALUES: Re, Ge, Be
CENTER OF ELLIPTICAL SHAPE(Cx, Cy)
CENTER OF GRADATION(Gx, Gy)
COLOR VALUES: Rs, Gs, Bs

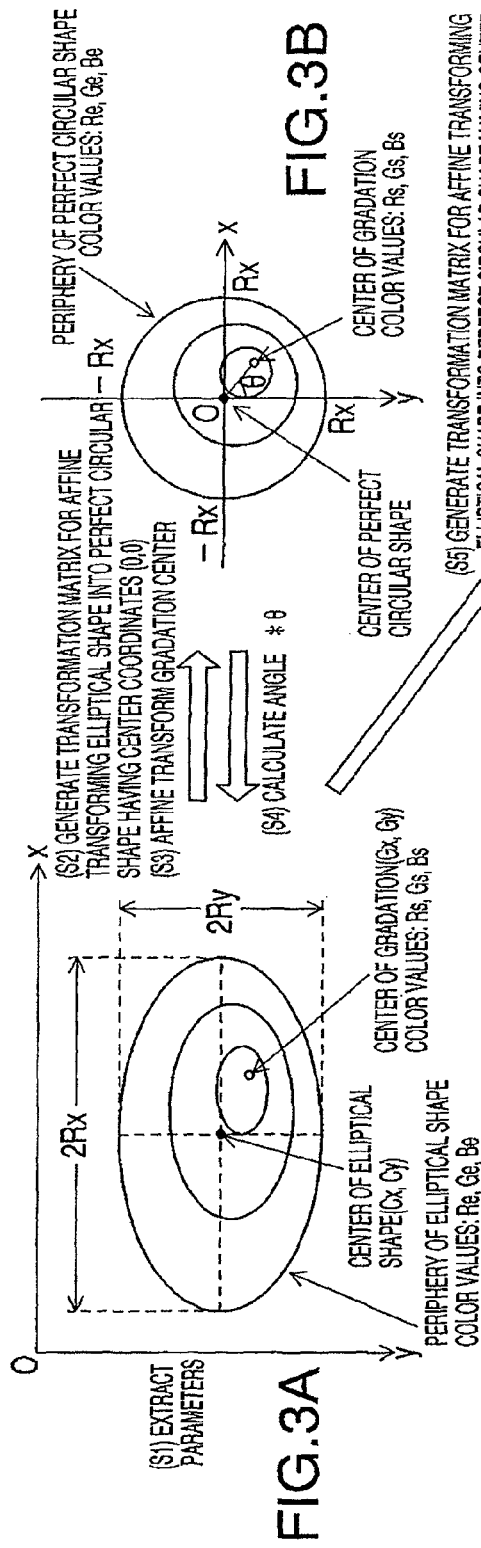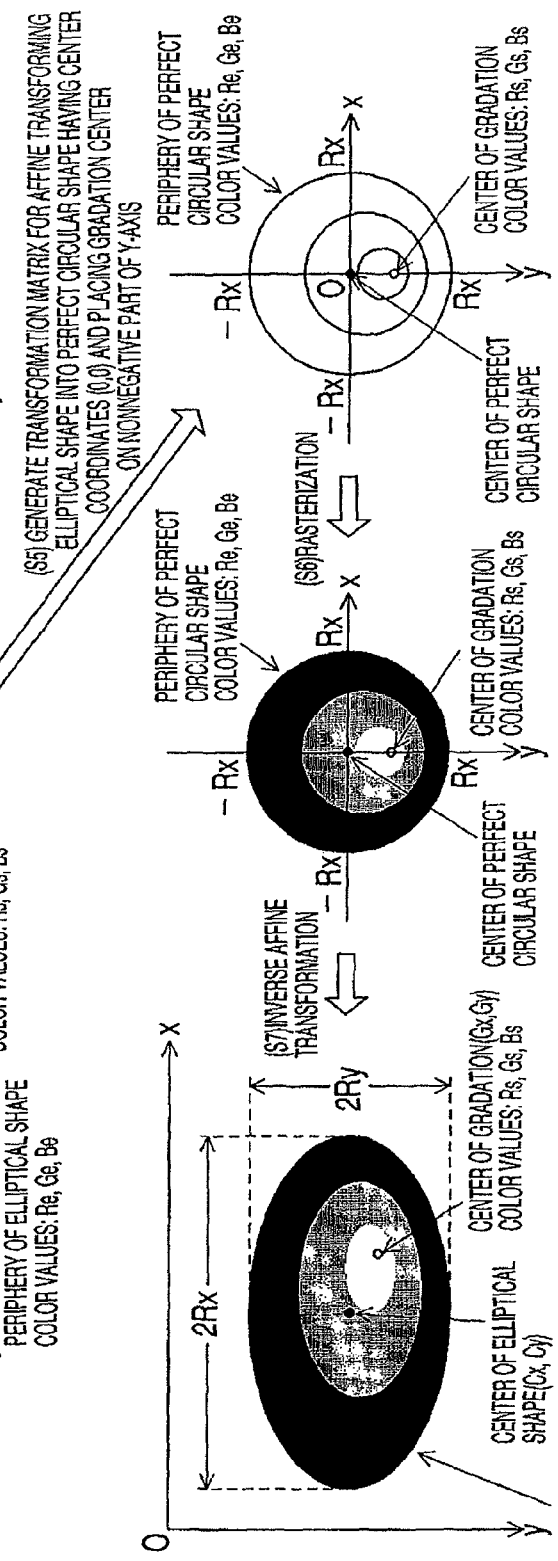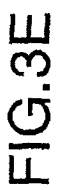

IMAGE GENERATING DEVICES AND PRINTING DEVICES THAT GENERATE ELLIPTICAL RADIAL GRADATIONS AND IMAGE GENERATING METHODS FOR GENERATING ELLIPTICAL RADIAL GRADATIONS

CROSS-REFERENCE TO RELATED APPLICATION

This application claims priority under 35 U.S.C. §119 from Japanese Patent Application No. 2008-93147 filed on Mar. 31, 2008. The entire subject matter of the application is incorporated herein by reference.

BACKGROUND

1. Technical Field

The present invention relates to an image generating device, an image generating method and a printing device.

2. Prior Art

With the evolving high performance of document preparation systems and document printing systems using computers in recent years, there are increasing desires of users for realizing complicated expression in drawing. For example, gradation (gradually changing the color in a prescribed drawing area) is being used a lot for effective presentation, for expressing three-dimensional shapes, etc.

In order to print such a gradation (i.e. an image having gradation) with a printer or display such a gradation on a display, it is necessary to generate a gradation pattern in the bitmap format and draw the gradation pattern on a page memory or frame memory. The drawing of the gradation is carried out by successively drawing (overlaying) multiple areas slightly differing in the color value while gradually shifting the drawing position of each area. The drawing of such a gradation requires complicated calculations since each of such areas (to be drawn with the same (uniform) color value) has to be determined and specified for the drawing.

Under such circumstances, various devices have been proposed in order to draw a gradation while reducing the load related to the drawing of the gradation. For example, an image formation device (capable of drawing a concentric circular gradation) described in Japanese Patent Provisional Publication No. HEI 11-31231 (hereinafter referred to as a "patent document #1") reduces the load for the gradation drawing by carrying out the gradation drawing by first determining color changing points (at each of which the color value changes) for each scan line and then drawing each line segment between two color changing points (on a scan line) with a uniform color value.

Meanwhile, the XML Paper Specification (hereinafter referred to simply as "XPS") has recently been established as a PDL (Page Description Language) for describing electronic documents, and a lot of products supporting XPS are being put on the market. In XPS, a RadialGradientBrush element can be described in a document as an image drawing instruction for drawing an elliptical radial gradation, by which more complicated gradational expression is made possible.

SUMMARY OF THE INVENTION

However, even though the method of drawing a concentric circular gradation is elaborated on in the patent document #1, the document (hereinafter, which will also be referred to as target data) includes no description about a technique for drawing an elliptical radial gradation. If the color changing points (around which different color values are used for the drawing) are calculated based on the locus of an elliptical shape in the process of drawing an elliptical radial gradation, extremely complicated calculations become necessary since the equation expressing the locus of the elliptical shape is already complicated, by which the load on the device (drawing the gradation) related to the drawing of the elliptical radial gradation becomes extremely heavy.

The present invention, which has been made in consideration of the above problems, is advantageous in that an image generating device, an image generating method and a printing device capable of generating an elliptical radial gradation while reducing the load related to the drawing of the gradation can be provided.

In accordance with an aspect of the present invention, there is provided an image generating device that is provided with a target data accepting unit that accepts target data including an image drawing instruction for drawing an elliptical radial gradation, an acquisition unit that acquires the image drawing instruction from the accepted target data, an extraction unit that extracts elliptical shape parameters specifying an elliptical shape of the elliptical radial gradation and gradation pattern parameters specifying a gradation pattern to be drawn in the elliptical shape from the acquired image drawing instruction, a transformation matrix generating unit that generates a transformation matrix for transforming the elliptical shape into a perfect circular shape based on the elliptical shape parameters, an inverse matrix calculating unit that calculates an inverse matrix of the transformation matrix, a transformation unit that transforms the gradation pattern parameters by use of the transformation matrix, a drawing unit that draws a gradation for the perfect circular shape, obtained by the transformation of the elliptical shape by the transformation matrix, based on the transformed gradation pattern parameters transformed by the transformation unit, and a gradation generating unit that generates the elliptical radial gradation by inversely transforming the perfect circular shape, in which the gradation has been drawn by the drawing unit, by use of the inverse matrix.

With the image generating device configured as above, when target data including an image drawing instruction for drawing an elliptical radial gradation is inputted, the target data is accepted by the target data accepting unit and the image drawing instruction is acquired from the target data by the acquisition unit. A transformation matrix for transforming the elliptical shape of the elliptical radial gradation into a perfect circular shape is generated by the transformation matrix generating unit based on the elliptical shape parameters (specifying the elliptical shape) extracted from the image drawing instruction by the extraction unit. The gradation pattern parameters (specifying the gradation pattern to be drawn in the elliptical shape) extracted from the image drawing instruction by the extraction unit are transformed by the transformation unit by use of the transformation matrix generated by the transformation matrix generating unit. Based on the transformed gradation pattern parameters, a gradation is drawn by the drawing unit for the perfect circular shape obtained by the transformation of the elliptical shape by the transformation matrix.

Since the gradation is first drawn in a perfect circular shape as above without directly drawing the specified gradation in the elliptical shape, the color changing points (around which different colors are drawn) can be calculated based on the locus of a perfect circle. Since the calculation for the drawing of the gradation can be simplified compared to the case where the gradation is drawn directly for the elliptical shape, the load related to the drawing of the gradation can be reduced considerably.

Meanwhile, the inverse matrix of the transformation matrix generated by the transformation matrix generating unit is calculated by the inverse matrix calculating unit. Finally, the elliptical radial gradation is generated by the gradation generating unit by inversely transforming the perfect circular shape (in which the gradation has been drawn by the drawing unit) by use of the inverse matrix calculated by the inverse matrix calculating unit. With this configuration, the elliptical radial gradation according to the elliptical shape and the gradation pattern specified by the parameters included in the image drawing instruction can be generated with ease. Consequently, an elliptical radial gradation can be generated while reducing the load related to the drawing of the gradation.

According to further aspects of the invention, there is provided an image generating method that includes a target data accepting step of accepting target data including an image drawing instruction for drawing an elliptical radial gradation, an acquisition step of acquiring the image drawing instruction from the accepted target data, an extraction step of extracting elliptical shape parameters specifying an elliptical shape of the elliptical radial gradation and gradation pattern parameters specifying a gradation pattern to be drawn in the elliptical shape from the acquired image drawing instruction, a transformation matrix generating step of generating a transformation matrix for transforming the elliptical shape into a perfect circular shape based on the elliptical shape parameters, an inverse matrix calculating step of calculating an inverse matrix of the transformation matrix, a transformation step of transforming the gradation pattern parameters by use of the transformation matrix, a drawing step of drawing a gradation in the perfect circular shape, obtained by the transformation of the elliptical shape by the transformation matrix, based on the transformed gradation pattern parameters; and a gradation generating step of generating the elliptical radial gradation by inversely transforming the perfect circular shape, in which the gradation has been drawn by the drawing step, by use of the inverse matrix.

Other objects, features and advantages of the present invention will become more apparent from the consideration of the following detailed description taken in conjunction with the accompanying drawings.

BRIEF DESCRIPTION OF THE ACCOMPANYING DRAWINGS

FIG. 2A is a schematic diagram showing an example of a RadialGradientBrush element and parameters specified by the element.

FIG. 2B is a schematic diagram showing an example of an elliptical radial gradation which is drawn according to the parameters specified by the RadialGradientBrush element.

FIGS. 3A-3E are schematic diagrams for explaining principles for drawing an elliptical radial gradation employed in the embodiment.

DETAILED DESCRIPTION OF THE EMBODIMENT

Figure 1:
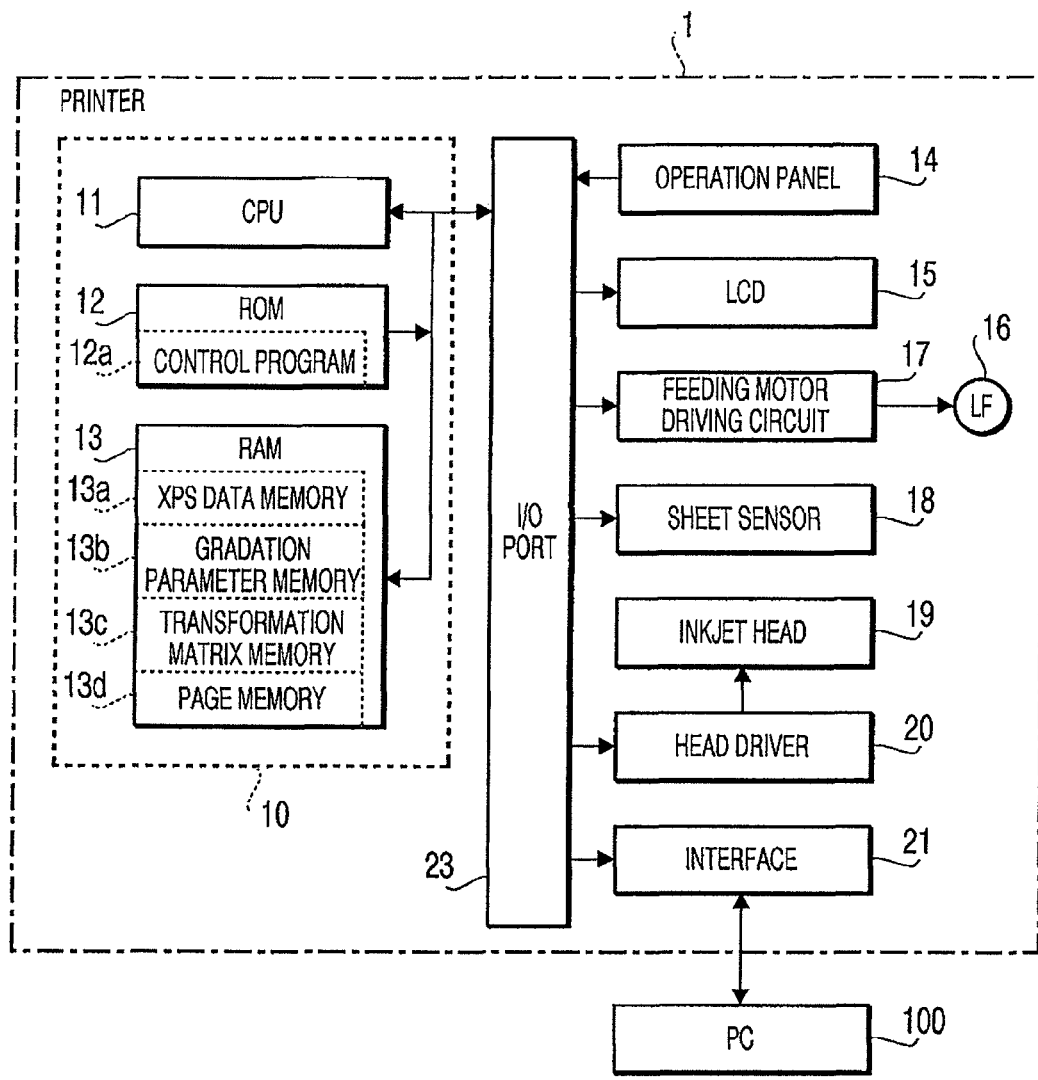
FIG. 1 is a block diagram showing the electrical configuration of a printer (including a printer control unit) in accordance with an embodiment of the present invention.

Referring now to the drawings, a description will be given in detail of a preferred embodiment in accordance with the present invention. FIG. 1 is a block diagram showing the electrical configuration of a printer 1 (including a printer control unit 10) in accordance with an embodiment of the present invention.

The printer 1 (inkjet printer equipped with an inkjet head 19) is a peripheral device for executing printing by discharging ink drops from nozzles of the inkjet head 19 toward a sheet (e.g. paper). The printer control unit 10 is a unit for controlling the overall operation of the printer 1 while generating image data to be printed by the printer 1.

The printer 1 is connected to a PC (Personal Computer) 100 via a communication cable or wireless communication. When a print command transmitted from the PC 100 is received, an electronic document described according to XPS (hereinafter referred to as an "XPS document") transmitted from the PC 100 together with the print command is analyzed and image data according to the XPS document is generated by the printer control unit 10, and then an image according to the generated image data is printed on a sheet by the inkjet head 19.

In this case, if a RadialGradientBrush element (an image drawing instruction ordering the drawing of an elliptical radial gradation) is included in the XPS document, an elliptical radial gradation specified by the RadialGradientBrush element is generated by the printer control unit 10 of the printer 1. The printer control unit 10 is configured to be capable of generating the elliptical radial gradation while reducing the load related to the drawing of the elliptical radial gradation. Incidentally, the "elliptical radial gradation" means a gradation (i.e. an image having gradation) in an elliptical shape in which the color value changes radially (with multiple elliptical areas in each of which a uniform color value is used for the drawing) from the center of the gradation to the periphery of the elliptical shape.

Next, the detailed configuration of the printer 1 of this embodiment will be described below. As shown in FIG. 1, the printer 1 is equipped with an operation panel 14, an LCD (Liquid Crystal Display) 15, a feeding motor (LF motor) 16, a feeding motor driving circuit 17, a sheet sensor 18, the inkjet head 19, a head driver 20 and an interface 21, as well as the printer control unit 10.

Among the components, the operation panel 14, the LCD 15, the feeding motor driving circuit 17, the sheet sensor 18, the head driver 20 and the interface 21 are connected to the printer control unit 10 via an I/O port 23. The feeding motor 16 is connected to the feeding motor driving circuit 17. The inkjet head 19 is connected to the head driver 20.

The printer control unit 10 includes a CPU (Central Processing Unit) 11, a ROM (Read Only Memory) 12 and a RAM (Random Access Memory) 13, which are connected together by a bus line 22. The bus line 22 is connected to the I/O port 23, via which signals are communicated between the printer control unit 10 and each component connected to the I/O port 23.

The CPU 11 is a processor for controlling the printer 1 and generating image data to be printed by the printer 1 according to programs and fixed values (data) stored in the ROM 12 and the RAM 13, various signals received from the PC 100 via the interface 21, etc.

The ROM 12 is a non-rewritable nonvolatile memory storing a control program 12a to be executed by the CPU 11, fixed values to be referred to by the control program 12a, etc. Programs necessary for executing a printing process (shown in a flow chart of FIG. 5) and an elliptical radial gradation rasterization process (shown in a flow chart of FIG. 6) are included in the control program 12a.

The program for the printing process (flow chart of FIG. 5) is run by the CPU 11 when a print command is received from the PC 100 via the interface 21, by which data received from the PC 100 together with the print command (e.g. XPS document) is analyzed and an image (image data) according to the data is generated.

Meanwhile, the program for the elliptical radial gradation rasterization process (flow chart of FIG. 6) is run by the CPU 11 as a subroutine of the program for the printing process (FIG. 5) in cases where an XPS document is received from the PC 100 and the received XPS document includes a RadialGradientBrush element as an instruction for drawing an elliptical radial gradation.

By running the program for the elliptical radial gradation rasterization process (FIG. 6), the CPU 11 generates a transformation matrix for affine transformation of an elliptical shape specified by the RadialGradientBrush element into a perfect circular shape (with its center placed on the origin) and then draws a gradation for (in) the perfect circular shape. The CPU 11 calculates the inverse matrix of the generated transformation matrix, and generates the elliptical radial gradation specified by the RadialGradientBrush element by inversely affine transforming the perfectly circular shape (in which the gradation has been drawn) by use of the inverse matrix. The details of the principles for the drawing of the elliptical radial gradation employed in this embodiment will be explained later with reference to FIGS. 3A-3E.

The RAM 13 is a rewritable volatile memory for temporarily storing various data. Storage areas such as an XPS data memory 13a, a gradation parameter memory 13b, a transformation matrix memory 13c and a page memory 13d are reserved in the RAM 13.

The XPS data memory 13a is memory (storage area) for temporarily storing the XPS document received from the PC 100 together with the print command. Upon reception of an XPS document from the PC 100, the interface 21 transfers the received XPS document to the XPS data memory 13a of the RAM 13 by means of DMA (Direct Memory Access), by which the XPS document received from the PC 100 is stored in the XPS data memory 13a.

The XPS document stored in the XPS data memory 13a is read out and the contents of the XPS document are analyzed by the CPU 11 when the printing process (see FIG. 5, explained later) is executed. The CPU 11 generates image data to be printed by the printer 1 by executing an image drawing process according to the contents of the XPS document, and stores the generated image data in the page memory 13d.

The gradation parameter memory 13b is memory for storing elliptical shape parameters (specifying an elliptical shape) and gradation pattern parameters (specifying a gradation pattern to be drawn in the elliptical shape) which are included in a RadialGradientBrush element (as an image drawing instruction ordering the drawing of an elliptical radial gradation) in the XPS document.

When a RadialGradientBrush element is included in the XPS document stored in the XPS data memory 13a, the CPU 11 executes the elliptical radial gradation rasterization process (FIG. 6) as a step of the printing process (FIG. 5), by which the elliptical shape parameters (specifying an elliptical shape) and the gradation pattern parameters (specifying a gradation pattern to be drawn in the elliptical shape) are extracted from the RadialGradientBrush element and the extracted parameters are stored in the gradation parameter memory 13b. The details of the RadialGradientBrush element included in an XPS document and the parameters included in the element will be explained later with reference to FIGS. 2A and 2B.

Among the parameters stored in the gradation parameter memory 13b, the elliptical shape parameters (specifying an elliptical shape) are used for generating the transformation matrix for the affine transformation of the elliptical shape into the perfect circular shape (with its center placed on the origin).

Among the parameters stored in the gradation parameter memory 13b, gradation center coordinates (see FIGS. 2A and 2B) included in the gradation pattern parameters (specifying a gradation pattern to be drawn in the elliptical shape) are affine transformed by use of the above transformation matrix.

Based on the gradation pattern parameters (including the gradation center coordinates after undergoing the affine transformation) stored in the gradation parameter memory 13b, a gradation is drawn for (in) the perfect circular shape obtained by the affine transformation.

The transformation matrix memory 13c is memory for storing the transformation matrix for the affine transformation from the elliptical shape (specified by the RadialGradientBrush element in the XPS document) into the perfect circular shape. By executing the elliptical radial gradation rasterization process (see FIG. 6, explained later), the CPU 11 generates the transformation matrix for the affine transformation from the elliptical shape into the perfect circular shape (with its center placed on the origin) based on the elliptical shape parameters stored in the gradation parameter memory 13b and then stores the generated transformation matrix in the transformation matrix memory 13c.

The transformation matrix stored in the transformation matrix memory 13c is used for the affine transformation of the gradation center coordinates (see FIGS. 2A and 2B) included in the gradation pattern parameters stored in the gradation parameter memory 13b.

In this case, if the gradation center coordinates after the affine transformation are not on a nonnegative part of the Y-axis, the CPU 11 generates a new transformation matrix by adding a rotational element to the original transformation matrix so that the gradation center coordinates after the affine transformation will be placed on the nonnegative part of the Y-axis. The newly generated transformation matrix is stored in the transformation matrix memory 13c by overwriting the original transformation matrix. The rotational element (which is added to the original transformation matrix) will be explained later with reference to FIGS. 3A-3E.

The gradation center coordinates (see FIGS. 2A and 2B) stored in the gradation parameter memory 13b are affine transformed again by use of the transformation matrix finally stored in the transformation matrix memory 13c (i.e. the transformation matrix to which the rotational element has been added). Based on the gradation pattern parameters (including the gradation center coordinates after undergoing the affine transformation again) stored in the gradation parameter memory 13b, a gradation is drawn for (in) the perfect circular shape obtained by the affine transformation of the elliptical shape.

For the transformation matrix finally stored in the transformation matrix memory 13c (i.e. the transformation matrix to which the rotational element has been added), an inverse matrix is calculated by the CPU 11. Then, the elliptical radial gradation specified by the RadialGradientBrush element is generated by the CPU 11 by inversely affine transforming the perfect circular shape (in which the gradation has been drawn) by use of the calculated inverse matrix.

The page memory 13d is memory for storing the image data to be printed by the printer 1 (generated by the printer control unit 10) in the bitmap format. The elliptical radial gradation generated by the elliptical radial gradation rasterization process (FIG. 6) and other image data generated according to the data (e.g. XPS document) are rasterized on the page memory 13d.

When the image data to be printed by the printer 1 has been rasterized on the page memory 13d by the printing process (FIG. 5) according to the data received from the PC 100 together with the print command, the CPU 11 drives the feeding motor driving circuit 17 and the head driver 20 and thereby prints an image corresponding to the image data stored in (rasterized on) the page memory 13d on a sheet (e.g. paper).

The operation panel 14 is a user interface including input buttons for letting the user make printer settings, input instructions, etc. The LCD 15 is a display device for displaying a variety of information (menu, operating status of the printer 1, etc.) depending to the user operation on the operation panel 14.

The feeding motor (LF motor) 16 is a stepping motor for feeding a sheet (placed at a prescribed position in/on the printer 1) downstream or upstream in the feeding direction. Driving control of the feeding motor 16 is executed by the feeding motor driving circuit 17 according to instructions from the CPU 11. By the driving of the feeding motor 16, the sheet is fed to the lower surface of the inkjet head 19 (to face the tips of the nozzles).

The inkjet head 19, as a print head having multiple nozzles (unshown) and actuators (unshown), is equipped with four inkjet head units corresponding to four color inks (cyan, magenta, yellow, black). The head driver 20 is a driving circuit for driving the actuators of the inkjet head 19.

The CPU 11 generates multivalued data corresponding to the four color inks (cyan, magenta, yellow, black) based on the image data stored in the page memory 13d and sends the generated multivalued data to the head driver 20 via a gate array (unshown). The head driver 20 generates driving pulses corresponding to the multivalued data supplied from the CPU 11 and applies the driving pulses to the actuators corresponding to the nozzles, by which ink drops are selectively discharged from the nozzles and an image corresponding to the image data stored in the page memory 13d is printed on a sheet.

The interface 21 is a unit for controlling data communication between the printer 1 and the PC 100. The printer 1 receives the print command and the data specifying the image to be printed (e.g. XPS document) from the PC 100 via the interface 21.

Upon reception of a print command from the PC 100, the interface 21 sends an interrupt signal (for reporting the reception of the print command) to the CPU 11. Upon reception of an XPS document from the PC 100, the interface 21 transfers the received XPS document to the XPS data memory 13a in the RAM 13 by means of DMA (Direct Memory Access).

In the following, the details of the RadialGradientBrush element included in an XPS document will be explained referring to FIGS. 2A and 2B. FIG. 2A is a schematic diagram showing an example of the RadialGradientBrush element and parameters specified by the element. FIG. 2B is a schematic diagram showing an example of an elliptical radial gradation which is drawn according to the parameters specified by the RadialGradientBrush element.

As shown in FIG. 2A, the RadialGradientBrush element is made up of a plurality of attributes and sub-elements. Among the attributes and sub-elements, a "Center" attribute 31, a "RadiusX" attribute 33 and a "RadiusY" attribute 34 give the elliptical shape parameters (specifying an elliptical shape). Meanwhile, a "GradientOrigin" attribute 32 and a RadialGradientBrush.GradientStops element 35 give the gradation pattern parameters (specifying a gradation pattern to be drawn in the elliptical shape).

The "Center" attribute 31 specifies the coordinates (Cx, Cy) of the center of the elliptical shape shown in FIG. 2B. Here, the "center of the elliptical shape" means a point where the major axis and the minor axis of the elliptical shape intersect with each other.

The "GradientOrigin" attribute 32 specifies the coordinates (Gx, Gy) of the center of the gradation shown in FIG. 2B (i.e. the gradation center coordinates). Here, the "center of the gradation" means a point where the color variation in the radial gradation starts (i.e. starting point of the gradation).

The radial gradation is expressed so that its color gradually changes from its center to points on the periphery of the elliptical shape specified by the RadialGradientBrush element (as endpoints of the color variation in the gradation (endpoints of the gradation)).

Incidentally, the parameters given by the "Center" attribute 31 and the "GradientOrigin" attribute 32 are described in terms of an orthogonal coordinate system represented by two coordinate axes (X-axis, Y-axis) intersecting with each other at right angles at an origin defined at the upper left corner of a printing area specified by the XPS document (see FIG. 2B).

In this orthogonal coordinate system, the (positive) X-axis extends in the horizontal direction of the printing area (from left to right), while the (positive) Y-axis extends in the vertical direction of the printing area (from top to bottom).

In the example of the RadialGradientBrush element shown in FIG. 2A, the center coordinates of the elliptical shape are specified as (150, 150) by the "Center" attribute 31, while the center coordinates of the gradation is specified as (200, 170) by the "GradientOrigin" attribute 32.

Meanwhile, the "RadiusX" attribute 33 specifies the radius Rx of the elliptical shape in the X-axis direction (hereinafter referred to as an "X-radius"), and the "RadiusY" attribute 34 specifies the radius Ry of the elliptical shape in the Y-axis direction (hereinafter referred to as a "Y-radius").

Incidentally, the major/minor axes of the elliptical shape (specified by the parameters of the "RadiusX" attribute 33 and the "RadiusY" attribute 34) are set in the X-axis direction and Y-axis direction.

Therefore, the smaller of Rx or Ry represents the minor axis radius of the elliptical shape, while the larger of Rx or Ry represents the major axis radius of the elliptical shape. As shown in FIG. 2B, the lengths of the elliptical shape in the X-axis direction and Y-axis direction are 2Rx and 2Ry, respectively.

In the example of the RadialGradientBrush element shown in FIG. 2A, the X-radius is specified as "140" by the "RadiusX" attribute 33, and the Y-radius is specified as "100" by the "RadiusY" attribute 34.

Meanwhile, the RadialGradientBrush.GradientStops element 35 gives parameters specifying color values of the gradation. The element 35 includes two sub-elements: Gradient- Stop elements 35a and 35b. Each GradientStop element (35a, 35b) includes a "Color" attribute and an "Offset" attribute.

The "Color" attribute specifies color values of red, green and blue at the point specified by the "Offset" attribute. In the "Color" attribute, the color values are described as a six-digit hexadecimal number, in which the most significant two digits specify the red color value (Rs or Re), the next two digits specify the green color value (Gs or Ge), and the least significant two digits specify the blue color value (Bs or Be).

The "Offset" attribute specifies the point having the color values specified by the "Color" attribute. For example, when the value of the "Offset" attribute is "0", it means that the color values specified by the "Color" attribute are those at the center (starting point) of the gradation. When the value of the "Offset" attribute is "1", it means that the color values specified by the "Color" attribute are those at the points on the periphery of the elliptical shape specified by the RadialGradientBrush element (i.e. at the endpoints of the gradation).

Therefore, the color values (Rs, Gs, Bs) of red, green and blue at the center (starting point) of the gradation (see FIG. 2B) are specified by the GradientStop element 35a, while the color values (Re, Ge, Be) of red, green and blue at the points on the periphery of the elliptical shape (i.e. at the endpoints of the gradation) (see FIG. 2B) are specified by the GradientStop element 35b.

In the example of the RadialGradientBrush element shown in FIG. 2A, the red/green/blue color values (Rs, Gs, Bs) at the center (starting point) of the gradation are specified as $(FF)_{16}$, $(FF)_{16}$ and $(00)_{16}$ by the GradientStop element 35a.

Meanwhile, the red/green/blue color values (Re, Ge, Be) at the points on the periphery of the elliptical shape (i.e. at the endpoints of the gradation) are specified as $(00)_{16}$, $(00)_{16}$ and $(FF)_{16}$ by the GradientStop element 35b. Incidentally, the value "$(FF)_{16}$" represents "FF" in the hexadecimal notation ("255" in the decimal notation) and the value "$(00)_{16}$" represents "00" in the hexadecimal notation ("0" in the decimal notation).

With the RadialGradientBrush element including such attributes and sub-elements, the drawing position of the elliptical shape in the printing area is determined from (specified by) the center coordinates (Cx, Cy) of the elliptical shape given by the "Center" attribute 31, and the shape and size of the periphery of the elliptical shape are determined from (specified by) the X-radius and the Y-radius of the elliptical shape given by the "RadiusX" attribute 33 and the "RadiusY" attribute 34, as shown in FIG. 2B. From the above information, the positions of the points on the periphery of the elliptical shape in the printing area are determined.

Meanwhile, the position of the center of the gradation in the printing area is determined (specified) by the gradation center coordinates (Gx, Gy) given by the "GradientOrigin" attribute 32.

The gradation pattern in the elliptical shape is determined by interpolation by use of the red/green/blue color values (Rs, Gs, Bs) at the center (starting point) of the gradation specified by the GradientStop element 35a and the red/green/blue color values (Re, Ge, Be) at the points on the periphery of the elliptical shape (i.e. at the endpoints of the gradation) specified by the GradientStop element 35b, depending on the distance between the center of the gradation and each point on the periphery of the elliptical shape.

In the following, the principles for the drawing of the elliptical radial gradation employed in this embodiment will be explained referring to FIGS. 3A-3E. FIGS. 3A-3E are schematic diagrams for explaining the principles for the drawing of the elliptical radial gradation. In the following explanation, the 3×3 matrix shown below will be expressed as (a, b, c, d, e, f).

$$(a, b, c, d, e, f) = \begin{pmatrix} a, & b, & 0 \\ c, & d, & 0 \\ e, & f, & 1 \end{pmatrix}$$

In this embodiment, when the data received from the PC 100 together with a print command is an XPS document and the XPS document includes a RadialGradientBrush element, the printer control unit 10 first extracts the parameters shown in FIG. 3A, that is, the elliptical shape parameters specifying an elliptical shape (i.e. the center coordinates (Cx, Cy), the X-radius Rx and the Y-radius Ry of the elliptical shape) and the gradation pattern parameters specifying a gradation pattern to be drawn in the elliptical shape (i.e. the center coordinates (Gx, Gy) of the gradation, the color values (Rs, Gs, Bs) at the center (starting point) of the gradation and the color values (Re, Ge, Be) at the periphery of the elliptical shape (endpoints of the gradation)), from the RadialGradientBrush element (S1 in FIG. 3A).

Incidentally, FIG. 3A is a schematic diagram (almost identical with FIG. 2B) showing an example of an elliptical radial gradation which is drawn according to the parameters specified by the RadialGradientBrush element.

Subsequently, the printer control unit 10 generates a transformation matrix A for affine transforming the elliptical shape shown in FIG. 3A into the perfect circular shape shown in FIG. 3B (whose radius is Rx and whose center coordinates are (0, 0)) by use of the extracted elliptical shape parameters, according to the following equation (1) (S2 in FIG. 3B):

$$A=(1,0,0,Rx/Ry,-Cx,-(Rx/Ry)\cdot Cy) \quad (1)$$

Incidentally, while a case where the elliptical shape shown in FIG. 3A is affine transformed into the perfect circular shape shown in FIG. 3B (having a radius Rx and center coordinates (0, 0)) is explained in this embodiment, the elliptical shape shown in FIG. 3A may also be affine transformed into a perfect circular shape having a radius Ry and center coordinates (0, 0), or into a perfect circular shape having a radius R (arbitrary value) and center coordinates (0, 0).

In the former case, the transformation matrix A is generated according to the following equation (2). In the latter case, the transformation matrix A is generated according to the following equation (3).

$$A=(Ry/Rx,0,0,1,-(Ry/Rx)\cdot Cx,-Cy) \quad (2)$$

$$A=(R/Rx,0,0,R/Ry,-(R/Rx)\cdot Cx,-(R/Ry)\cdot Cy) \quad (3)$$

Subsequently, the printer control unit 10 affine transforms the gradation center coordinates (Gx, Gy) shown in FIG. 3A using the transformation matrix A generated by the equation (1) (S3 in FIG. 3B). Then, the printer control unit 10 judges whether the center of the gradation after the affine transformation (see FIG. 3B) is on the nonnegative part of the Y-axis or not. If the gradation center after the affine transformation is not on the nonnegative part of the Y-axis, the printer control unit 10 calculates an angle θ between the positive Y-axis and a line segment connecting the origin (0, 0) and the gradation center (see FIG. 3B) (S4 in FIG. 3B).

Subsequently, the printer control unit 10 generates a transformation matrix B1 for rotation around the origin by the angle θ (affine transformation) according to the following equation (4), and then generates a transformation matrix B (i.e. the transformation matrix A to which a rotational element has been added) by multiplying the transformation matrix A by the transformation matrix B1 as shown in the following equation (5) (S5 in FIG. 3C).

$$B1=(\cos\theta, \sin\theta, -\sin\theta, \cos\theta, 0, 0) \quad (4)$$

$$B=A\cdot B1 \quad (5)$$

On the other hand, if the gradation center after the affine transformation using the transformation matrix A generated by the equation (1) is on the nonnegative part of the Y-axis, the transformation matrix A of the equation (1) is directly used as the transformation matrix B.

Subsequently, the printer control unit 10 affine transforms the gradation center coordinates (Gx, Gy) shown in FIG. 3A again by use of the transformation matrix B, by which the elliptical shape shown in FIG. 3A is transformed into a perfect circular shape having a radius Rx and center coordinates (0, 0) and the gradation center is placed on the nonnegative part of the Y-axis as shown in FIG. 3C.

Subsequently, the printer control unit 10 executes a rasterization process for drawing a radial gradation for (in) the perfect circular shape shown in FIG. 3C (S6 in FIG. 3C). Specifically, the printer control unit 10 executes the rasterization process by generating a radial gradation shown in FIG. 3D so that the red/green/blue color values in the gradation gradually change from the values (Rs, Gs, Bs) at the starting point of the gradation (i.e. the gradation center after the affine transformation placed on the nonnegative part of the Y-axis) to the values (Re, Ge, Be) at the endpoints of the gradation (i.e. the periphery of the perfect circular shape) and storing the generated radial gradation (in the perfect circular shape) in the RAM 13 in the bitmap format.

Figure 4:
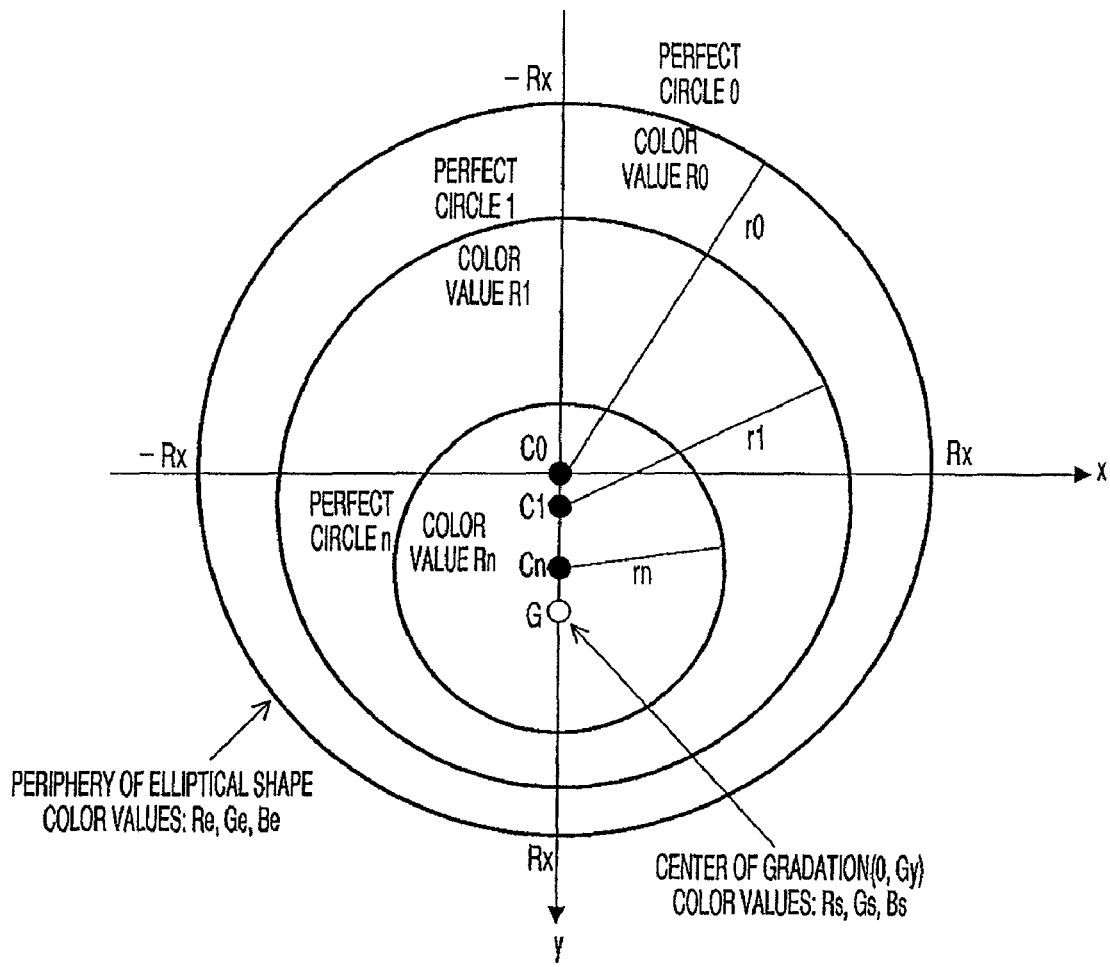
FIG. 4 is a schematic diagram for explaining a method of generating a red radial gradation for a radial gradation in a perfect circular shape.

Here, the method of generating the radial gradation in the perfect circular shape will be explained referring to FIG. 4. FIG. 4 is a schematic diagram for explaining a method of generating a red radial gradation for the radial gradation in the perfect circular shape. For generating the radial gradation in the perfect circular shape, radial gradations of red, green and blue are generated independently. The methods of generating the green radial gradation and the blue radial gradation are identical with the method of generating the red radial gradation (explained here), and thus illustration and explanation thereof are omitted for brevity.

A radial gradation (of red, green or blue) in the perfect circular shape is generated by successively calculating the center coordinates and the radius of each perfect circular shape having a uniform color value and successively drawing each perfect circular shape (specified by the center coordinates and the radius) with the uniform color value, from the periphery of the (outermost) perfect circular shape.

Specifically, the printer control unit 10 first determines the center coordinates C0 and the radius r0 of the periphery of the (outermost) perfect circular shape (perfect circle 0) as (0, 0) and Rx, respectively. Subsequently, the printer control unit 10 sets a (red) color value R0 for the points on the perfect circle 0 (specified by the center coordinates C0 and the radius r0) and the inside of the perfect circle 0 at the color value Re which has been specified for the periphery of the (outermost) perfect circular shape (endpoints of the gradation), and then draws the points on the perfect circle 0 and the inside of the perfect circle 0 with the color value R0 (=Re).

Subsequently, the printer control unit 10 calculates center coordinates C1 (C1x, C1y), a radius r1 and a color value R1 of an inner perfect circle 1 (which is immediately inside the perfect circle 0 and for which the color value R1 different from the color value R0 of the perfect circle 0 is used) by use of the following equations (6)-(9):

$$C1x=0 \quad (6)$$

$$C1y=G'y\cdot k/(Re-Rs) \quad (7)$$

$$r1=r0-r0\cdot k/(Re-Rs) \quad (8)$$

$$R1=Re-k \quad (9)$$

where "G'y" denotes the Y coordinate of the gradation center after the affine transformation by the transformation matrix B, and "k" denotes the variation (difference) in the color value between two adjacent perfect circles.

In this embodiment, the color value variation k is set at "−1" when the color value Rs at the gradation center is larger than the color value Re at the periphery of the (outermost) perfect circular shape, or at "+1" when the color value Rs at the gradation center is smaller than the color value Re at the periphery of the (outermost) perfect circular shape. Incidentally, the color value variation k may be set properly so that the color variation in the gradation looks smooth, in consideration of the human sense, characteristics of the color space, color reproduction performance of the printer 1, etc.

Subsequently, the printer control unit 10 draws the inside of the perfect circle 1 (specified by the center coordinates C1 (C1x, C1y) and the radius r1 calculated by the equations (6)-(8)) with the color value R1 calculated by the equation (9).

Thereafter, the printer control unit 10 successively calculates the center coordinates, the radius and the color value of each subsequent (inner) perfect circle (2, 3, ..., n, ...) from outside, while drawing the inside of each perfect circle 2, 3, ..., n, ... (specified by the calculated center coordinates and radius) with the calculated color value. The process is repeated until the drawing of a perfect circle drawn with the color value Rs is completed. Incidentally, the center coordinates Cn (Cnx, Cny), the radius rn and the color value Rn of each (inner) perfect circle n are calculated by use of the following equations (10)-(13):

$$Cnx=0 \quad (10)$$

$$Cny=G'y\cdot n\cdot k/(Re-Rs) \quad (11)$$

$$rn=r0-r0\cdot n\cdot k/(Re-Rs) \quad (12)$$

$$Rn=Re-n\cdot k \quad (13)$$

The radial gradation in the perfect circular shape is generated by the method described above. In this method, the gradation center has been placed on the nonnegative part of the Y-axis by the affine transformation using the transformation matrix B, and thus the X coordinate can be fixed at "0" in the calculation of the center coordinates of each perfect circular shape having a uniform color value.

In other words, the center coordinates of each perfect circular shape to be drawn with a uniform color value can be calculated as a one-dimensional function (using the Y coordinate only), by which the number of calculations necessary for the drawing of the radial gradation in the perfect circular shape can be reduced considerably.

Further, by the placement of the gradation center on the nonnegative part of the Y-axis by the affine transformation by the transformation matrix B, the gradation center after the affine transformation can be fixed at the center of the perfect circular shape or at a position on the positive side of the center of the perfect circular shape.

Returning to FIG. 3D, to the perfect circular shape in which the gradation shown in FIG. 3D (stored in the RAM 13) has been drawn, the printer control unit 10 executes the inverse affine transformation (S7 in FIG. 3D). The inverse affine transformation is executed using a transformation matrix as the inverse of the transformation matrix B (used for the affine transformation of the elliptical shape shown in FIG. 3A into the perfect circular shape shown in FIG. 3C (in which the gradation has been drawn at this point)).

By drawing the gradation in the perfect circular shape obtained by the affine transformation of the elliptical shape (specified by the RadialGradientBrush element) by the transformation matrix B and then executing the inverse affine transformation to the perfect circular shape (in which the gradation has been drawn) by the inverse matrix of the transformation matrix B as above, the elliptical radial gradation specified by the RadialGradientBrush element can be generated as shown in FIG. 3E. The elliptical radial gradation generated as above is stored in the page memory 13d in the bitmap format, by which the rasterization of the elliptical radial gradation is completed.

Figure 5:
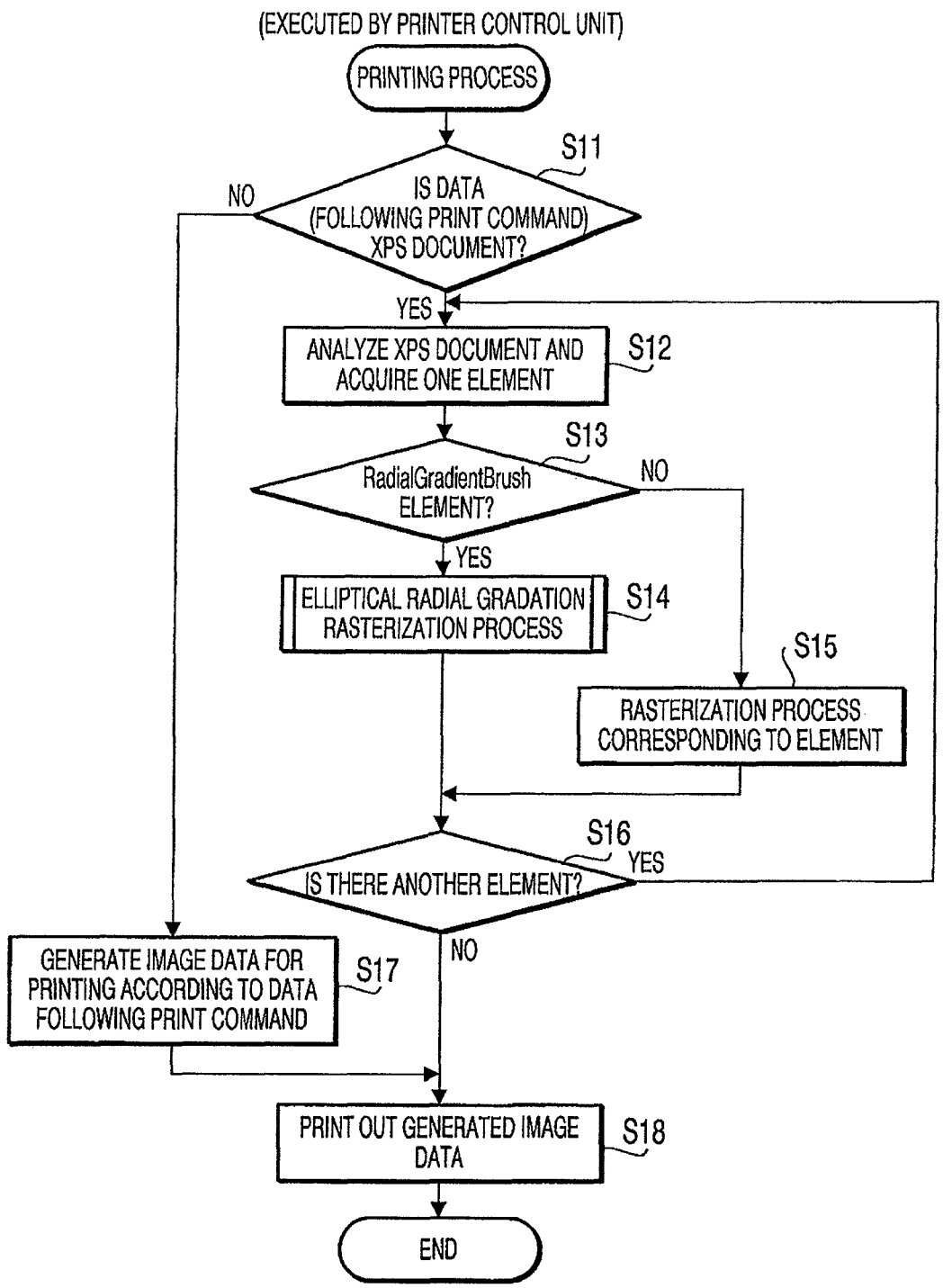
FIG. 5 is a flow chart of a printing process which is executed by the printer control unit.

In the following, the process flow of the printing process executed by the printer control unit 10 will be described referring to FIG. 5. FIG. 5 is a flow chart of the printing process. The printing process, for generating the image data to be printed by the printer 1 based on the data received (following the print command) from the PC 100 via the interface 21 and printing out the generated image data, is started when the interrupt signal (sent from the interface 21 for informing the CPU 11 of the reception of the print command) is detected by the CPU 11.

At the start of the printing process, the printer control unit 10 judges whether the data received from the PC 100 following the print command is an XPS document (document described according to XPS) or not (S11). When the data is an XPS document (S11: YES), the printer control unit 10 (CPU 11) reads out the XPS document (which has been transferred from the interface 21 to the XPS data memory 13a by means of DMA (Direct Memory Access)) from the XPS data memory 13a, analyzes the contents of the XPS document, and acquires one element included in the XPS document (S12).

Subsequently, the printer control unit 10 judges whether the element acquired in S12 is a RadialGradientBrush element or not (S13). When the acquired element is a RadialGradientBrush element (S13: YES), the printer control unit 10 (judging that the acquired element is an instruction for drawing an elliptical radial gradation) executes the elliptical radial gradation rasterization process (FIG. 6) which will be explained later (S14).

By the elliptical radial gradation rasterization process, the elliptical radial gradation specified by the RadialGradientBrush element can be generated while reducing the load related to the drawing of the elliptical radial gradation. The generated elliptical radial gradation is rasterized on the page memory 13d. After the step S14, the process advances to step S16.

On the other hand, when the element acquired in S12 is not a RadialGradientBrush element (S13: NO), the printer control unit 10 executes a rasterization process corresponding to the acquired element, stores image data generated by the rasterization process in the page memory 13d (S15), and advances to the step S16.

In the step S16, the printer control unit 10 judges whether the XPS document still includes an element that has not been extracted (acquired) in S12 yet. When the XPS document includes an element yet to be extracted (S16: YES), the printer control unit 10 returns to the step S12 to repeat the steps S12-S16 for the next element.

The steps S12-S16 are repeated until all the elements included in the XPS document are extracted in S12 and the rasterization process (S14 or S15) is completed for all the elements (S16: NO), by which the image data specified by the XPS document is rasterized on the page memory 13d.

In this case where all the elements included in the XPS document have been extracted in S12 and the rasterization process (S14 or S15) has been completed for all the elements (S16: NO), the process advances to step S18.

Meanwhile, when the data received from the PC 100 following the print command is not an XPS document in S11 (S11: NO), the printer control unit 10 generates image data (for printing) according to the contents of the data received following the print command and then stores the generated image data in the page memory 13d (S17). Thereafter, the process advances to the step S18.

In the step S18, the printer control unit 10 sends signals to the feeding motor driving circuit 17 and the head driver 20 based on the image data generated in S11-S17 and stored in the page memory 13d, by which the feeding motor 16 and the inkjet head 19 are driven and an image according to the image data is printed on a sheet (completion of the printing process of FIG. 5).

By the printing process (FIG. 5) explained above, upon reception of a print command from the PC 100, image data can be generated based on the data following the print command, and an image according to the generated image data can be printed on a sheet.

In the printing process, when an XPS document is received from the PC 100 as the data following the print command, the XPS document is analyzed. When a RadialGradientBrush element is included in the XPS document, the elliptical radial gradation rasterization process (explained below) is executed, by which the printer control unit 10 is allowed to generate the elliptical radial gradation specified by the RadialGradientBrush element while reducing the load related to the drawing of the elliptical radial gradation.

Figure 6:
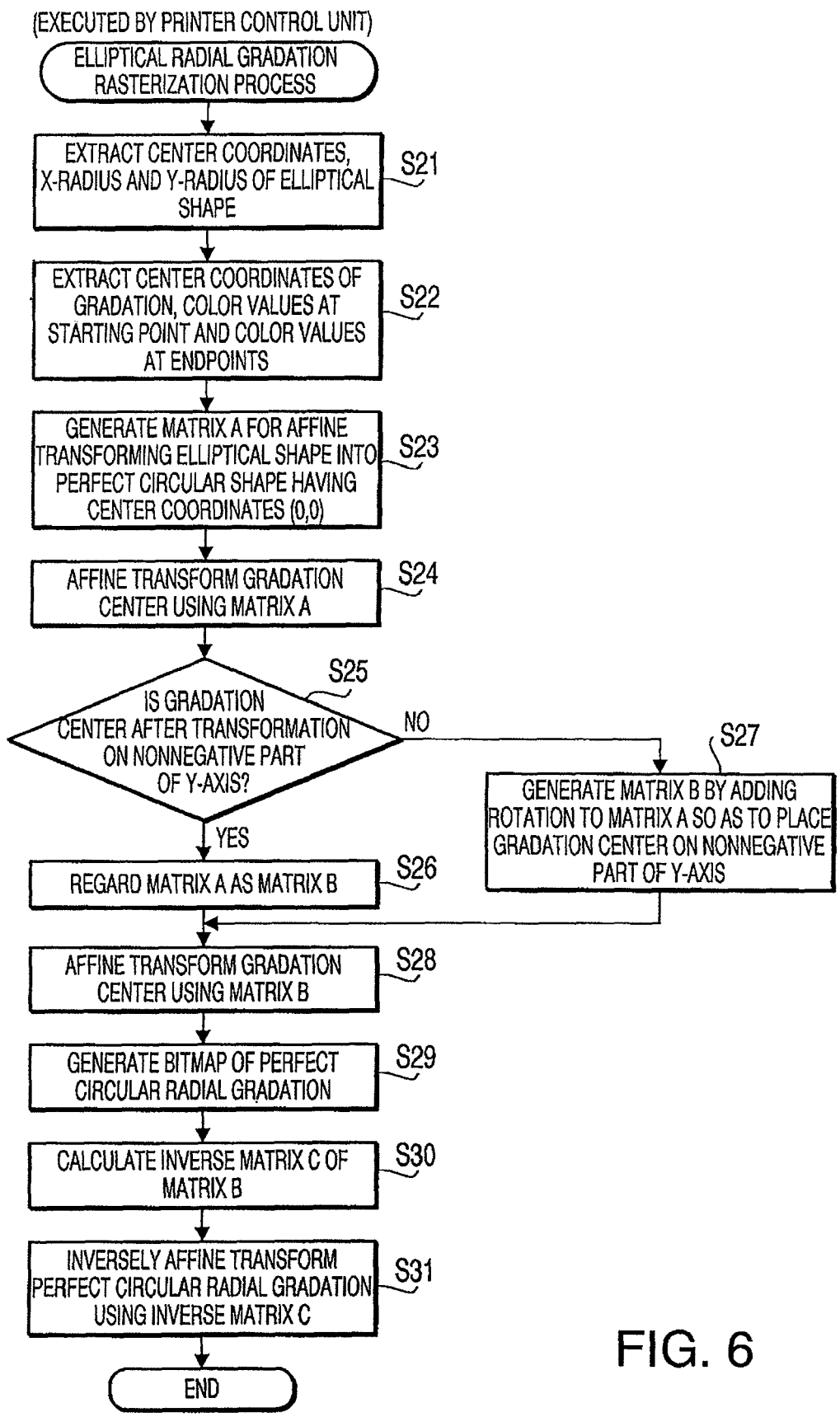
FIG. 6 is a flow chart of an elliptical radial gradation rasterization process which is executed by the printer control unit.

Next, the elliptical radial gradation rasterization process, which is executed by the printer control unit 10 as the step S14 in FIG. 5, will be explained referring to FIG. 6. FIG. 6 is a flow chart of the elliptical radial gradation rasterization process.

The elliptical radial gradation rasterization process, for generating an elliptical radial gradation specified by a RadialGradientBrush element included in an XPS document, is executed when the data following the print command is an XPS document and a RadialGradientBrush element is included in the elements described in the XPS document in the printing process (FIG. 5) executed by the printer control unit 10 (CPU 11). The elliptical radial gradation rasterization process (FIG. 6) will be explained below while associating it with the aforementioned principles for the drawing of the elliptical radial gradation shown in FIGS. 3A-3E.

At the start of the elliptical radial gradation rasterization process, the printer control unit 10 extracts the center coordinates (Cx, Cy), the X-radius Rx and the Y-radius Ry of the elliptical shape (see FIGS. 2A and 2B) from the RadialGradientBrush element as the elliptical shape parameters (specifying an elliptical shape) and stores the extracted parameters in the gradation parameter memory 13b (S21).

Subsequently, the printer control unit 10 extracts the center coordinates (Gx, Gy) of the gradation, the red/green/blue color values (Rs, Gs, Bs) at the center (starting point) of the gradation and the red/green/blue color values (Re, Ge, Be) at the periphery of the elliptical shape (endpoints of the gradation) (see FIGS. 2A and 2B) from the RadialGradientBrush element as the gradation pattern parameters (specifying a gradation pattern to be drawn in the elliptical shape) and stores the extracted parameters in the gradation parameter memory 13b (S22). These steps S21 and S22 correspond to the step S1 shown in FIG. 3A.

Subsequently, the printer control unit 10 reads out the elliptical shape parameters stored in the gradation parameter memory 13b, generates the transformation matrix A for the affine transformation from the elliptical shape specified by the RadialGradientBrush element (see FIG. 3A) into the perfect circular shape having a radius Rx and center coordinates (0, 0) (see FIG. 3B) by use of the equation (1), and stores the generated transformation matrix A in the transformation matrix memory 13c (S23).

Incidentally, the step S23 may be configured to generate a different transformation matrix A by use of the equation (2) and store the generated transformation matrix A in the transformation matrix memory 13c so as to affine transform the elliptical shape into a perfect circular shape having a radius Ry and center coordinates (0, 0), as mentioned above.

The step S23 may also be configured to generate a different transformation matrix A by use of the equation (3) and store the generated transformation matrix A in the transformation matrix memory 13c so as to affine transform the elliptical shape into a perfect circular shape having a radius R (arbitrary value) and center coordinates (0, 0), as mentioned above.

This step S23 corresponds to the step S2 shown in FIG. 3B.

After generating the transformation matrix A and storing it in the transformation matrix memory 13c (S23), the printer control unit 10 affine transforms the gradation center coordinates (Gx, Gy) stored in the gradation parameter memory 13b using the transformation matrix A stored in the transformation matrix memory 13c (S24). This step S24 corresponds to the step S3 shown in FIG. 3B.

Subsequently, the printer control unit 10 judges whether the gradation center coordinates obtained by the affine transformation of S24 are on the nonnegative part of the Y-axis or not (S25). When the gradation center coordinates after the affine transformation are on the nonnegative part of the Y-axis (S25: YES), the printer control unit 10 keeps the transformation matrix A stored in the transformation matrix memory 13c in order to use the transformation matrix A directly as the transformation matrix B (S26). Thereafter, the process advances to step S28.

On the other hand, when the gradation center coordinates after the affine transformation are not on the nonnegative part of the Y-axis (S25: NO), the printer control unit 10 calculates the angle θ between the positive Y-axis and the line segment connecting the origin (0, 0) and the gradation center after the affine transformation (see FIG. 3B) (step S4 shown in FIG. 3B), generates the transformation matrix B by adding the rotational operation around the origin (0, 0) by the angle θ (i.e. the aforementioned rotational element) to the transformation matrix A stored in the transformation matrix memory 13c by use of the equations (4) and (5) (step S5 shown in FIG. 3C), and stores the generated transformation matrix B in the transformation matrix memory 13c by overwriting the transformation matrix A (S27). Thereafter, the process advances to the step S28.

By executing the steps S25-S27 as above, the transformation matrix B, for affine transforming the elliptical shape specified by the RadialGradientBrush element (see FIG. 3A) into the perfect circular shape having the radius Rx and center coordinates (0, 0) and placing the gradation center on the nonnegative part of the Y-axis (see FIG. 3C), can be generated.

In the step S28, the printer control unit 10 affine transforms the gradation center coordinates (Gx, Gy) stored in the gradation parameter memory 13b by using the transformation matrix B this time, by which the center of the gradation is placed on the nonnegative part of the Y-axis.

Subsequently, for the perfect circular shape shown in FIG. 3C having the radius Rx and center coordinates (0, 0), the printer control unit 10 generates a radial gradation so that the color values in the gradation gradually change from the gradation center placed on the nonnegative part of the Y-axis (i.e. the starting point of the gradation) to the periphery of the perfect circular shape (i.e. the endpoints of the gradation), and stores the generated radial gradation in the RAM 13 in the bitmap format (S29).

In this step S29, the printer control unit 10 reads out the red/green/blue color values (Rs, Gs, Bs) at the center (starting point) of the gradation from the gradation parameter memory 13b and uses the color values (Rs, Gs, Bs) as the red/green/blue color values at the center (starting point) of the gradation after the affine transformation placed on the nonnegative part of the Y-axis.

Meanwhile, the printer control unit 10 also reads out the red/green/blue color values (Re, Ge, Be) at the periphery of the elliptical shape (i.e. endpoints of the gradation) from the gradation parameter memory 13b and uses the color values (Re, Ge, Be) as the red/green/blue color values at the periphery of the perfect circular shape obtained by the affine transformation (i.e. endpoints of the gradation).

Then, the printer control unit 10 generates the radial gradation in the perfect circular shape by the aforementioned method (of generating the radial gradation in the perfect circular shape) which has been explained referring to FIG. 4, by which the perfect circular radial gradation shown in FIG. 3D is generated. This step S29 corresponds to the step S6 shown in FIG. 3D.

In the next step S30, the printer control unit 10 calculates an inverse matrix C of the transformation matrix B which has been kept or stored in the transformation matrix memory 13c in S26 or S27. By use of the inverse matrix C, the printer control unit 10 inversely affine transforms the perfect circular radial gradation stored in the RAM 13 in S29, stores the result of the inverse affine transformation in the page memory 13d in the bitmap format (S31), and ends the elliptical radial gradation rasterization process of FIG. 6.

By the step S31, the elliptical radial gradation specified by the RadialGradientBrush element can be generated as shown in FIG. 3E and rasterized on the page memory 13d. This step S31 corresponds to the step S7 shown in FIG. 3E.

As above, in the elliptical radial gradation rasterization process executed by the printer control unit 10, the gradation is first drawn in a perfect circular shape (without directly drawing the specified gradation in the elliptical shape), by which the color changing points (around which different colors are drawn) can be calculated based on the locus of a perfect circle. Since the calculation for the drawing of the gradation can be simplified compared to the case where the gradation is drawn directly for the elliptical shape, the load related to the drawing of the gradation can be reduced considerably.

Further, since the inverse matrix C of the transformation matrix B (generated based on the elliptical shape parameters to transform the elliptical shape into the perfect circular shape) is calculated and the perfect circular shape in which the gradation has been drawn is inversely affine transformed using the inverse matrix C, the radial gradation according to the elliptical shape and the gradation pattern specified by the RadialGradientBrush element can be generated with ease.

Thus, in cases where there exists a RadialGradientBrush element in a document described according to XPS, an elliptical radial gradation specified by the RadialGradientBrush element can be generated while reducing the load related to the drawing of the gradation.

Furthermore, since the center of the gradation after the affine transformation is placed on the Y-axis, the center positions (center coordinates) of the perfect circular shapes (in each of which a uniform color value is used for the drawing) are calculated along the Y-axis and the gradation is drawn for the perfect circles. With this method, the center positions of the perfect circles (perfect circular shapes in each of which a uniform color value is used for the drawing) can be calculated by using a one-dimensional function represented by the Y coordinate of the center position. Therefore, the number of calculations necessary for the drawing of the gradation in the perfect circular shape can be reduced further, and consequently, the load related to the drawing of the radial gradation can be reduced further.

As described above, by the printer control unit 10 of the printer 1 in accordance with this embodiment, the elliptical shape specified by the RadialGradientBrush element is transformed into a perfect circular shape, a gradation is drawn for (in) the perfect circular shape, and then the elliptical radial gradation is obtained by inversely transforming the gradation drawn in the perfect circular shape, by which the elliptical radial gradation specified by the RadialGradientBrush element can be generated while reducing the load related to the drawing of the radial gradation.

Further, with the printer 1 in accordance with this embodiment, when data received from the PC 100 following a print command includes an instruction for drawing an elliptical radial gradation, the elliptical radial gradation is generated based on the drawing instruction by the above printer control unit 10. Therefore, the printing of an elliptical radial gradation can be carried out by generating the elliptical radial gradation while reducing the load related to the drawing of the radial gradation.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the major axis and minor axis of the elliptical shape specified by the RadialGradientBrush element (image drawing instruction) of the XPS document are set in the X-axis direction and Y-axis direction in the above embodiment, the major axis and minor axis of the elliptical shape may be set in arbitrary directions.

In this case, it is possible to first execute rotational affine transformation to the elliptical shape specified by the image drawing instruction so as to set its major axis and minor axis in the X-axis direction and Y-axis direction, generate the elliptical radial gradation according to the drawing principles explained referring to FIGS. 3A-3E, and finally execute inverse rotational affine transformation to the obtained elliptical radial gradation to return the major axis and minor axis of the (rotated) elliptical shape to the original directions specified by the image drawing instruction.

While the color values at the center (starting point) of the gradation and the color values at the periphery of the elliptical shape (endpoints of the gradation) are specified by the RadialGradientBrush.GradientStops element included in the RadialGradientBrush element in the above embodiment, the above embodiment is applicable also to cases where the RadialGradientBrush.GradientStops element further includes a GradientStop element which specifies color values at an arbitrary point between the starting point and endpoint of the gradation.

In this case, a value represented by an "Offset" attribute of the GradientStop element specifying the color values at the arbitrary point indicates a (relative) distance d between the starting point of the gradation and the arbitrary point for which the color values are specified by the GradientStop element (when the distance between the starting point and an endpoint of the gradation situated on a line extending from the starting point and crossing the arbitrary point is normalized to "1"). Therefore, the drawing of the gradation for (in) the perfect circular shape can be executed by setting color values of corresponding points (that are the (relative) distance d away from the center (starting point) of the perfect circular gradation) at the color values of the arbitrary point specified by the GradientStop element.

While the inverse matrix C of the transformation matrix B is calculated after generating the radial gradation for the perfect circular shape in the elliptical radial gradation rasterization process (FIG. 6) in the above embodiment, the timing of the inverse matrix calculation is not restricted to that in the above embodiment; the inverse matrix C may be calculated at any time after the generation of the transformation matrix B and before the inverse affine transformation of the perfect circular shape in which the radial gradation has been drawn.

While the elliptical radial gradation rasterization process (FIG. 6) is executed when (on condition that) data received from the PC 100 following a print command is an XPS document and a RadialGradientBrush element (as an instruction for drawing an elliptical radial gradation) is included in the XPS document in the above embodiment, the condition for executing the elliptical radial gradation rasterization process is not restricted to that in the embodiment. The elliptical radial gradation rasterization process may be executed at any time when an instruction for drawing an elliptical radial gradation is included in PDL data (data described in a PDL (Page Description Language)) received from the PC 100 following a print command.

While the printer control unit 10 is provided inside the printer 1 in the above embodiment, the printer control unit 10 may be provided outside the printer 1 and connected to the printer 1 via a communication cable or wireless communication. The printer control unit 10 may also be provided inside the PC 100.

While the elliptical radial gradation rasterization process (FIG. 6) is executed by the printer control unit 10 to generate an elliptical radial gradation to be printed by the printer 1 in the above embodiment, the elliptical radial gradation rasterization process may be executed not only by such a printer control unit but also by any unit/device that controls a device for outputting an elliptical radial gradation. For example, in cases where a display is used for displaying an elliptical radial gradation, a display control unit for controlling the display may execute the elliptical radial gradation rasterization process (FIG. 6) and rasterize the elliptical radial gradation generated by the process on a frame memory for storing image data to be displayed on the display.

While the printer 1 in the above embodiment prints an image (e.g. elliptical radial gradation) on a sheet (e.g. paper) as a print medium, the printer 1 may also be configured to execute the printing on other types of print media (fabric, plastic, vinyl, etc.).

While the transformation matrix B is generated so as to place the center of the gradation after the affine transformation on the nonnegative part of the Y-axis in the above embodiment, the transformation matrix B may also be generated so as to place the gradation center (after the affine transformation) on the nonpositive part of the Y-axis.

What is claimed is:

1. An image generating device comprising:
a target data accepting unit that accepts target data comprising an image drawing instruction for drawing an elliptical radial gradation;
an acquisition unit that acquires the image drawing instruction from the accepted target data;
an extraction unit that extracts elliptical shape parameters specifying an elliptical shape of the elliptical radial gradation and gradation pattern parameters specifying a gradation pattern to be drawn in the elliptical shape from the acquired image drawing instruction;
a transformation matrix generating unit that generates a transformation matrix for transforming the elliptical shape into a circular shape based on the elliptical shape parameters;
an inverse matrix calculating unit that calculates an inverse matrix of the transformation matrix;
a transformation unit that transforms the gradation pattern parameters using the transformation matrix;
a drawing unit that draws a gradation for the circular shape and stores the gradation for the circular shape in a memory in a bitmap format, the circular shape obtained by transforming the elliptical shape using the transformation matrix, based on the transformed gradation pattern parameters transformed using the transformation unit; and
a gradation generating unit that generates the elliptical radial gradation by inversely transforming the gradation for the circular shape drawn and stored in the memory by the drawing unit, using the inverse matrix.

2. The image generating device according to claim 1, wherein:
the gradation pattern parameters comprise positional information on a center of the gradation drawn in the elliptical shape, and
the image generating device further comprises a setting unit that sets a transformed center of the gradation obtained by the transformation using the transformation unit, which is determined by the positional information on the center of the gradation after being transformed by the transformation unit, on a coordinate axis intersecting the center of the circular shape, and
the drawing unit draws the gradation in the circular shape by calculating a center position of each circle, to be drawn with a uniform color along the coordinate axis.

3. The image generating device according to claim 1, wherein:
the target data accepting unit is configured to accept target data described according to XML Paper Specification,
the image generating device further comprises an instruction judgment unit which judges that the acquired image drawing instruction comprises an instruction for drawing an elliptical radial gradation when the acquired image drawing instruction comprises a RadialGradientBrush element, and
the extraction unit extracts center coordinates, a major axis radius of the elliptical shape, and a minor axis radius of the elliptical shape from the RadialGradientBrush element as the elliptical shape parameters, while extracting center coordinates of the gradation as the gradation pattern parameters.

4. A printing device comprising an image generating unit that generates an image and a printing unit that prints the image generated by the image generating unit on a print medium, wherein the image generating unit comprises:
a target data accepting unit that accepts target data comprising an image drawing instruction for drawing an elliptical radial gradation;
an acquisition unit that acquires the image drawing instruction from the accepted target data;
an extraction unit that extracts elliptical shape parameters specifying an elliptical shape of the elliptical radial gradation and gradation pattern parameters specifying a gradation pattern to be drawn in the elliptical shape from the acquired image drawing instruction;
a transformation matrix generating unit that generates a transformation matrix for transforming the elliptical shape into a circular shape based on the elliptical shape parameters;
an inverse matrix calculating unit that calculates an inverse matrix of the transformation matrix;
a transformation unit that transforms the gradation pattern parameters using the transformation matrix;
a drawing unit that draws a gradation in the circular shape and stores the gradation for the circular shape in a memory in a bitmap format, the circular shape obtained by transforming the elliptical shape using the transformation matrix, based on the transformed gradation pattern parameters transformed using the transformation unit; and
a gradation generating unit that generates the elliptical radial gradation by inversely transforming the gradation for the circular shape drawn and stored in the memory by the drawing unit, using the inverse matrix.

5. The printing device according to claim 4, wherein:
the gradation pattern parameters comprise positional information on a center of the gradation drawn in the elliptical shape, and
the image generating unit further comprises a setting unit that sets a transformed center of the gradation obtained by the transformation by the transformation unit, which is determined by transformed positional information obtained by transforming the positional information using the transformation unit, on a coordinate axis intersecting a center position of the circular shape, and
the drawing unit draws the gradation in the circular shape by calculating a center position of each circle, to be drawn with a uniform color along the coordinate axis.

6. The printing device according to claim 4, wherein:
the target data accepting unit is configured to accept target data described according to XML Paper Specification, and
the image generating unit further comprises an instruction judgment unit which judges that the acquired image drawing instruction comprises an instruction for drawing an elliptical radial gradation when the acquired image drawing instruction comprises a RadialGradientBrush element, and
the extraction unit extracts center coordinates, a major axis radius of the elliptical shape, and a minor axis radius of the elliptical shape from the RadialGradientBrush element as the elliptical shape parameters, while extracting center coordinates of the gradation as the gradation pattern parameters.

7. An image generating method comprising:
a target data accepting step of accepting target data comprising an image drawing instruction for drawing an elliptical radial gradation;
an acquisition step of acquiring the image drawing instruction from the accepted target data;

an extraction step of extracting elliptical shape parameters specifying an elliptical shape of the elliptical radial gradation and gradation pattern parameters specifying a gradation pattern to be drawn in the elliptical shape from the acquired image drawing instruction;

a transformation matrix generating step of generating a transformation matrix for transforming the elliptical shape into a circular shape based on the elliptical shape parameters;

an inverse matrix calculating step of calculating an inverse matrix of the transformation matrix;

a transformation step of transforming the gradation pattern parameters using the transformation matrix;

a drawing step of drawing a gradation in the circular shape and storing the gradation for the circular shape in a bitmap format, the circular shape obtained by transforming the elliptical shape using the transformation matrix, based on the transformed gradation pattern parameters; and a gradation generating step of generating the elliptical radial gradation by inversely transforming the gradation for the circular shape, drawn and stored in the memory in the drawing step, using the inverse matrix.

8. The image generating method according to claim 7, wherein:

the gradation pattern parameters comprise positional information on a center of the gradation drawn in the elliptical shape, and the image generating method further comprises a setting step of setting a transformed center position of the gradation obtained in the transformation step, which is determined by transformed positional information obtained by transforming the positional information in the transformation step, on a coordinate axis intersecting a center position of the circular shape, and the drawing step further comprises drawing the gradation in the circular shape by calculating a center position of each circle, to be drawn with a uniform color along the coordinate axis.

9. The image generating method according to claim 7, wherein:

the target data accepting step further comprises accepting target data described according to XML Paper Specification, and the image generating method further comprises an instruction judgment step of judging that the acquired image drawing instruction comprises an instruction for drawing an elliptical radial gradation when the image drawing instruction acquired by the acquisition step comprises a RadialGradientBrush element, and the extraction step further comprises extracting center coordinates, a major axis radius of the elliptical shape, and a minor axis radius of the elliptical shape from the RadialGradientBrush element as the elliptical shape parameters, while extracting center coordinates of the gradation as the gradation pattern parameters.

* * * * *